United States Patent Office 3,260,304
Patented July 12, 1966

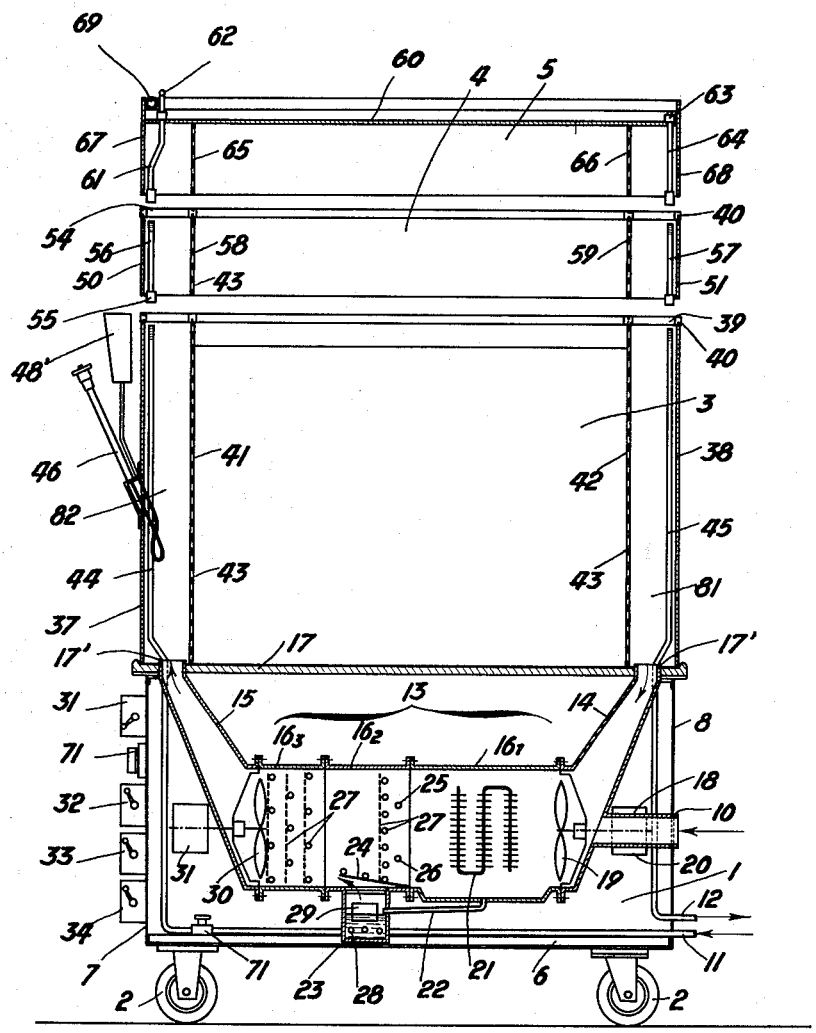

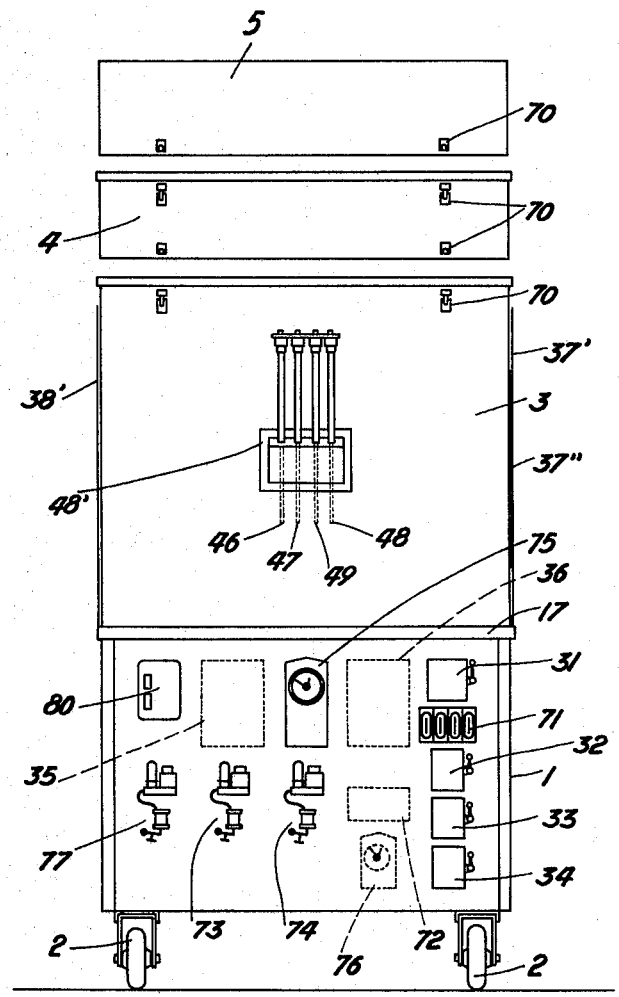

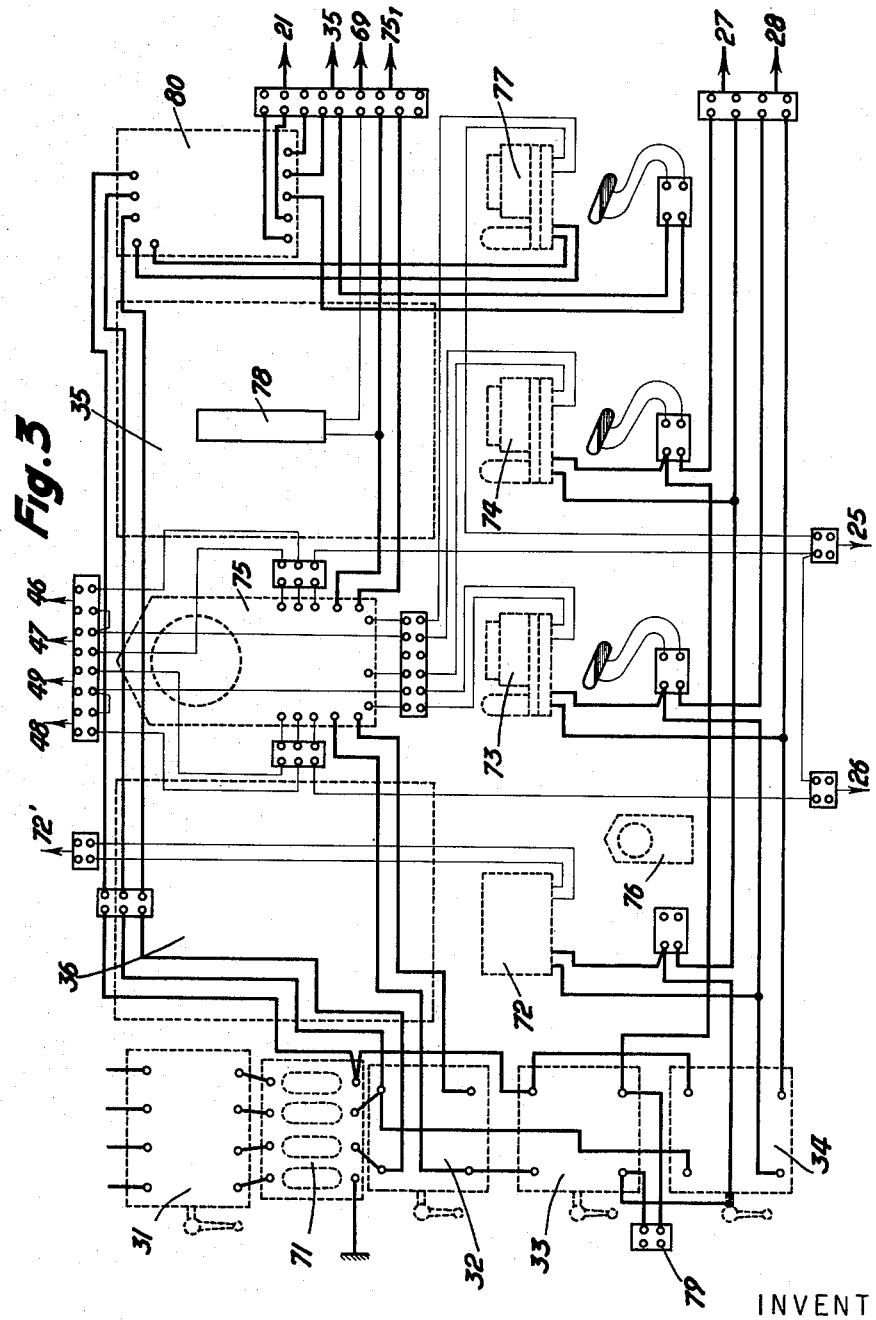

3,260,304
AIR-CONDITIONED CHAMBER AND ITS APPLICATIONS
Henri Rabéchault, Le Perreux, France, assignor to Etablissement Public: Office de la Recherche Scientifique et Technique Outre-Mer, Paris, France, a corporation of France
Filed June 11, 1964, Ser. No. 374,526
Claims priority, application France, June 29, 1963, 939,892
6 Claims. (Cl. 165—12)

The present invention relates to an air-conditioned chamber characterised by being detachable and extendible as required, and which is particularly advantageous for the investigation of controlled growth, for the regulated cultivation of plants and for studying the behaviour of plant and other organisms according to predetermined programs.

Practical research into the life of plant organisms was carried out until recently in greenhouses, but this did not give results of sufficient accuracy to be directly utilized in a practical manner. Some of the drawbacks to this empirical method of working were overcome by the use of a phytotron, consisting of a building having light and dark rooms for studying and cultivating plants in predetermined conditions.

However, these recent methods are still not sufficiently precise to allow work to be undertaken which takes into account all the necessities of research as well as the dependable utilization of the various facts which are established experimentally. Even if the buildings used are not permanent they must at least be semi-permanent, which for all practical purposes excludes the possibility of changing the program of the separate rooms making up the installations, as well as all possibility of doing away with the mutual interference of the varying environments or conditions of research exercise on one another when different research programs are carried out in the same room, as is generally the case. These drawbacks rule out serious scientific or industrial use of the costly installations mentioned above. One solution which was suggested to counteract these drawbacks consisted in setting up numerous small independent units of "microphytotrons." The use of rooms or fixed greenhouses, more or less adequately air-conditioned, was also suggested, but up to the present it has not been possible to obtain research and/or cultivation equipment which could be operated according to a given program instantaneously modifiable at any given moment.

The present invention provides a solution to all the problems met with in research as well as at the level of industrial production, enabling work to be carried out simultaneously on cases as numerous and as widely varying as may be desired, including all necessary alterations to the environmental cycles.

According to the invention the air-conditioned chamber consists essentially of a lower element, preferably mounted on wheels, and containing the mechanisms for conditioning air and for presenting the operation of the said mechanisms; of at least one detachable middle element bolted on top of the lower element in such a way that it is airtight, with an airtight door in at least one of its walls. The bottom of this middle element forms the ceiling of the lower element, and has two openings in it which communicate with the interior of the lower element; vertical interior partitions pierced with holes are set into the middle element in such a way as to form two shafts each of which communicates with the openings mentioned above; an upper element of roof fitted on top of the middle element in such a way as to be airtight; controllable devices for spraying, lighting and heating controlled independently by the mechanisms in the lower element being mounted in the middle element. It is preferable for the lighting system to be set in the roof element, as well as the superficial water circulation system.

When several middle elements are used they are similar to the one placed on the element housing the mechanisms insofar as the shaft partitions are concerned, but they do not necessarily have lighting systems or doors.

The vertical walls of the middle elements and the roof may be opaque, transparent or translucent and of any material, but preferably of a plastic material. They may be single or double, and in this case have lagging between them, or thick and made of expanded resins.

The roof preferably consists of a flat tank of plastic material, "Plexiglas" for instance; a correctly regulated system for water circulation may be provided for by a piping system passing through the various middle elements and emerging into the roof tank, an overflow pipe being provided to carry the water back.

The lowest element has two interconnected hoppers each of which is connected in an airtight manner to one of the openings in the ceiling corresponding to the shafts of the middle element. These hoppers are connected inside the element by a sheath containing, in order, at least one fan near the outlet of one of the hoppers and one adjustable inlet for fresh air; a refrigerating evaporator for cooling and drying the air blown in, a means of collecting condensation water; elements to check the temperature of the cooled air; means of moistening this dried air, and finally, adjustable heating apparatus for heating the moistened air placed near the outlet of the sheath; i.e. at the entrance to the second hopper.

At the inlet to the second hopper the sheath may have a variable-speed fan and/or a grating through which flows the warmed, moistened air.

The air-conditioning chamber as described above according to the invention may be put to many varying uses; it is especially suitable for laboratory research related to systematic work, especially the cultivation and growth of plants, it has the very considerable advantage of allowing at any given moment a controlled change to be carried out in the given program, such as the sudden insertion of special variables, if their influence on certain developments is required to be known. The possibility of easily altering the dimensions of an air-conditioned chamber by the addition of extra middle elements enables the growth of trees and bushes to be followed.

The operation of the chamber according to the invention is such that it enables the temperture of the air, by day and by night, to be altered at will over any length of cycle, for example, over 24 hours or more; the hygrometry of the air can be altered at will by day and by night over a cycle of 24 hours or longer; the control of the intensity and composition of light; control of the length of "days" and "nights"; control of the speed of flow, of distribution and composition of the air; horizontal air circulation which affects the entire mass of foliage; a choice of interchangeability of the materials of which the walls are made, which may be transperent, translucent or opaque, so that they allow direct observation of the products treated. In addition, according to the invention, the chamber enables simultaneous studies to be carried out on products (plants or otherwise) of very varied nature, without any reactional interference occurring, either physical or chemical, which might affect any other experiment, so that a research laboratory can be installed in an ordinary building which only has to be equipped with a water supply, power, environmental heat and so on.

By means of the present invention it thus becomes possible, according to the most varied requirements which may arise, to carry out any "working" of materials, and research work, by enlarging or reducing the volume of one or more chambers, by moving them or placing them in a special external heating or lighting environment for example, obtained by any known methods.

Here follows a detailed description of an air-conditioned chamber according to the invention, reference being made to the attached drawings. In these drawings:

FIG. 1 is a side view in vertical cross section of a chamber according to the invention.

FIG. 2 is a front view of the same chamber.

FIG. 3 gives a connection diagram of electrical circuits controlling the mechanisms of the chamber illustrated in FIGURES 2 and 3.

In the example shown the air-conditioned chamber consists of a lowest element 1 mounted on a certain number of swivelling castors of known type; of a main middle element 3; of a secondary middle element 4 and a roof 5. The lowest, or carrying, element 1 consists of a metal frame 6 with end panels 7 and 8 made of plastic material, and side panels 9 with ventilation gratings. On panel 7 are placed the various switches needed to control the mechanisms, which will later be described in greater detail. Panel 8 has an opening 10 for the fresh air inlet pipe and openings for the water inlet pipe 11 and outlet pipe 12. A sheath 13 is placed inside element 1; this sheath consists of an inlet hopper 14 and an outlet hopper 15, connected by a horizontal junction having three connected metal sections, $16_1$, $16_2$ and $16_3$. The free ends of hoppers 14 and 15 are connected in any suitable airtight manner to the bottom 17, which is preferably lagged, of the main middle element 3. Connected to hopper 14 is an inlet pipe 18 passing through the opening 10. In the axis of the horizontal air-conditioning sheath 13 a fan 19 operated at any suitable and variable speed by the motor 20, is mounted in the connecting zone between hopper 15 and section $16_1$ of the sheath; a refrigerating evaporator with fins 21, supplied with dichlorodifluoro methane such as Freon C12 or C22 by a compressor (not illustrated) is placed in section $16_1$.

A lower platform (not shown), or the bottom of section $16_1$, is connected by a pipe 22 to a moistening tank 23 placed directly beneath section $16_2$ of the sheath, into which it opens by a baffle plate 24. Two contact thermometers 25 and 26 are placed at the entrance to section $16_2$ and are intended, as will be seen later on, for day and night respectively. The heating resistances 27 are situated in sections $16_2$ and $16_3$; a heating device 28 is placed in tank 23 which also has an inlet ball-cock 29. In the installation shown a second fan 30 working at a suitable variable speed is set at the outlet of section $16_3$, in axial line with fan 19.

On the front panel 7 various switches are shown, namely a main switch 31; light switch 32; switch for the heating fan 33; moisture switch 34; the programer 35; analogue analyser 36; as well as relays, fuses, clocks and current breakers, the function of which will be described in detail further on. The doors giving access to the interior of carrier element 1 are not shown in the drawings.

The main middle element 3, which is an important part of the air conditioned chamber, has a bottom 17, at the ends of which are found the openings $17_1$ to which are attached the inlet and outlet hoppers 14 and 15. The vertical partitions 37 and 38, 37' and 38' are made of a resin known commercially as "Plexiglas." The upper edges of the partitions are held by flanged frame 39 with an airtight joint 40 of rubber or other suitable material. Two partitions 41 and 42 made of rigid plastic material are placed parallel to the front wall 37 and back wall 38 and fixed to the frame 39 and the bottom 17. These partitions are pierced with holes 43 which form, with their corresponding walls 37 or 38, a shaft for circulating or withdrawing air. The holes 43 can be closed by flaps (not shown) acting on at least a part of the perforated partitions. Two pipes 44, 45 are fixed along the partitions 37 and 38, connected respectively by their lower ends to the water inlet and outlet pipes 11 and 12. The upper ends of pipes 44 and 45 are threaded for any connections which it may be desired to make. The front wall 37 has two thermometers 46, 47 and two moisture thermometers 48, 49 for day and night respectively, with a thermometer moistening tank 48'; the side walls 37' and 38' have doors 37" made of the same material and hermetically closed by any known means.

The secondary element 4 consists of a four sided frame 50–51, and 52–53 held by two mountings 54–55 between which are placed two lengths of piping 56, 57 respectively screwed on the threaded ends of pipes 44, 45, and two sections of partitioning 58, 59, pierced by holes 43 and placed in such a way that they extend the partitions 41 and 42.

The roof 5 is constructed in the same manner as the secondary element described above, and has a flat ceiling 60 which forms the bottom of a water tank, the tube element 61, connected to pipe 56 and forming the spraying system 62, emerges above one end of this tank, whilst at the other end the opening 63 of pipe 64 forms an overflow system connected to pipe 57. Two sections of partitioning 65, 66 are fixed beneath the ceiling 60 and are attached to the corresponding edges of the partitions in the middle element 4, parallel to the outer walls 67, 68 of the ceiling. An ultra-violet lighting system 69 is placed along at least one of the walls of the roof element (67 in the example given).

Spring hooks 70 of any known types, are provided for to hold the various elements together. A tap 71 is provided for in order to regulate the flow of water in circulation either by hand or automatically, and the piping 11 may be equipped, directly or indirectly, for spraying the interior of the middle element or elements.

The electrical equipment of the air-conditioned chamber is described in detail below, referring more especially to FIGURE 3. In the installation being described the power supply is three phase current (such as 220 v., 17 a.). An earthing system is provided on the metallic frame 6, on the compressor of the refrigerating system 21 and on the metallic junctions $16_1$, $16_2$, $16_3$.

The electrical equipment includes safety fuses 71, a relay 72 for control of the interior spray 72'; a relay 73 for the heating control 28 of the moistener 23; a clock 75 specially for the lighting system $75_1$; a clock 76 to control any known auxiliary device such as, for example, one for airing the nutritive solutions in cases where the chamber is used for studying and/or cultivating plants; a relay 77 for controlling the refrigerating group 21; a transformer 78 for the ultra-violet lighting system 69; a simple or multiple branch circuit for the fan and/or fans 19 (and/or 20); and finally, a circuit breaker 80, preferably a heat circuit breaker, to protect the refrigerating unit 21.

The electric clock 75 connects the various thermometers 46 to 49, 25 and 26, according to the time, whether given by the programer 35 or not, with the various relays 73, 74 and 75 to the controls of the refrigerating group 21, the main lighting system 75 and the ultra-lighting system 69, the reheater 27 and the moistening unit 28.

A plant to be studied according to a determined program given to the programer 35 is placed on the floor 17 of the middle element 3, the doors 37" are closed and the main switch is switched on, as are the switches controlling ventilation, heating, humidity and lighting. The various mechanisms mounted in the lower element 1 start operating as a function of the temperatures and hygrometric state which it is desired should obtain in the chamber and which are stored in the programer 35 in the known manner; the fan 19 draws in air from the rear shaft 81 (between the wall 38 and partition 42), and the fan 30 blows it back to the front shaft 82, which it passes through by way of holes 43 at various levels in the chamber 3, 4, 5, to enter shaft 81 by way of holes 43. In passing through the sheath 13 air from the shaft 81, which may be regenerated by an appropriate quantity of fresh air entering through the inlet 18, is first cooled and dried in the refrigerating evaporator 21, the condensation water from it runs into the tank 23 by way of pipe 22, and also through the baffle plate 24 and pipe 22; the temperature of the dry air is marked by thermometers 25 and 26 and acts, through the relay, on the functioning of the refrigerating group; it is then heated by the resistances 27 and moistened by the vapour produced in tank 23 by the effect of the submerged resistance of known type 28. The moistened heated air is drawn by fan 30 into shaft 82. The temperature and hygrometry of the chamber 3, 4, 5 is measured by thermometers 46, 47, 48 and 49, and controlled according to the program as a function of their indications. The ultra-violet lighting system 69 is started, as is the normal lighting system 75₁ from clock 75 through the corresponding relays. The film of water circulating on the roof 60 between the spray 62 and the overflow 63 allows a large part of the infra red emitted by the lamps to be recuperated. The current for the lamps comes from a cable (not shown) which passes through one of the four conduits which rise along each vertical side of the shafts. The length of the day, or lighting time, may be set to a cycle of 24 hours or longer by a clock. It is thus possible to obtain either long 24/24 hour days, or ≥12 hours, or short days ≤12 hours, according to the program decided upon; the chamber may also be used both as a light chamber by being exposed to the sun (transparent model) or as a dark room if it is placed in a darkened place or if it is constructed of opaque plastic material such as black "vulcadur."

The behaviour of products treated and the actual characteristics of the atmosphere created around them are recorded in the analyser 36, which also enables easy examination of reactions, whether due to "live" modifications or not, of one or another of the elements producing the environment.

It is obvious that the chamber as it is described in the invention can be modified in many ways. For example, only a single fan may be used; turbulence gratings may be set in the conditioning sheath 13; the water tank may be placed outside the said sheath and water be fed into it from outside; by the use of compressed air water may be sprayed into the air to moisten it; the normal thermometers may be replaced by germanium resistances or lithium candles in order that the programer may operate more easily. Finally, a continuously operating recorder may be used as well as, or in place of, the analyser.

What I claim is:

1. In an air-conditioned chamber a lowest element having the form of a box open at the top, with vertical walls and closed at the bottom; at least one main middle element having an exterior form corresponding to the lowest element, vertical walls, open at the top and closed at the bottom, two openings in the bottom placed near the vertical walls of the element; means of fixing the lower part of the middle element onto the upper part of the lowest element in such a manner that it is airtight but may be detached; at least one airtight door in the vertical wall of the middle element; two vertical partitions each enclosing one of the openings in the bottom of the middle element and rising through the said element; adjustable sized holes set in the said vertical partitions; and upper element, closed at the top and open at the bottom; the walls of the upper element are prolonged vertically above its closed upper end; means for fixing the upper element on top of the middle element in an airtight manner; two vertical partitions pierced with adjustable holes and fixed in the upper element in such a way that they continue the vertical partitions of the middle element; an opening in one outer wall of the lowest element, a closed assembly fixed in the lowest element and more or less parallel to the bottom of this element, having two ends and a lower part; in one end of this assembly there is a first opening, with piping covering it to connect it to the opening in the wall of this element; a second opening with piping covering it to connect it to one of the openings in the main middle element; in the other end of this assembly there is a opening with piping covering it connecting it in the other opening in the bottom of the main middle element; in the bottom of the lowest element is an opening and, sealed to the bottom, a tank the same size as this opening and containing a certain quantity of water; means of heating this tank; means of controlling the level of water in this tank; a hole in one wall of the said tank and a hole in the bottom of the lowest element, a pipe between the latter hole and the hole in the wall of the tank, this pipe does not protrude into the interior of the assembly; in the interior of the assembly, starting from the end where the two holes are situated, a fan drawing in air through the two holes at the end; a refrigerating element; means of measuring the temperature; means of heating; means for water to enter the tank; fixed in the lowest element, the middle element and the upper element and connectable one to the other, means to bring the water from the tank to above the level of the closed top of the upper element, and means to make the water flow over the said closed top from one side and means to drain away the water which has run over the top; outside the airtight door of the main middle element dry thermometers and moisture thermometers which pass through the door in such a way as to show the temperatures inside the element; means of lighting, placed on at least one edge of the upper element; on the lowest element a motor for the fan, and inlet for electrical current; means of connecting the said motor to the said inlet as required; controllable means to carry the current to the heating system contained in the said assembly; controllable means to carry the current to the means of heating the water in the above mentioned tank; controllable means to carry lighting current to the upper element; an operational programer; means of connecting current to the programer; means of connecting the programer to the measuring thermometers inside the assembly and those in the door of the middle element, to the refrigerating element and to the heating system placed in the assembly, to the fan for drawing in air, to the water inlet system and to the lighting system, means to switch the current independently on and off the various apparatus connected to the programer.

2. In an air-conditioned chamber according to claim 1, between the main middle element and the upper element, at least one middle element without top or bottom, in this element there are two verical partitions pierced with holes and set in such a manner as to prolong the vertical partitions in the main middle element; water pipes connected to the corresponding elements in the main middle and upper elements.

3. A chamber according to claim 2 in which at least a part of the walls of all the elements and the bottom of the main middle element and the top of the upper element are not opaque to light.

4. An air-conditioned chamber according to claim 2 in which at least a part of the walls of the elements and their bottom and upper ends are lagged.

5. An air-conditioned chamber according to claim 1 in which a baffle is placed above the opening connecting the tank to the interior of the assembly, this baffle being sloped in the direction of the hole pierced in the bottom of the assembly and connected to the inside of the tank.

6. A chamber according to claim 1 having a variable-speed fan placed in the assembly near the second end, a motor from this second fan and means of connecting the said motor to the current intake by means of a programer and means of measuring the temperature set both in the assembly and in the door of the middle element.

References Cited by the Examiner

UNITED STATES PATENTS

| | | | |
|---|---|---|---|
| 2,107,268 | 2/1938 | Avery et al. | 165—20 |
| 2,244,634 | 6/1941 | Sisson | 165—20 |
| 2,547,657 | 4/1951 | Olsen | 165—20 |

ROBERT A. O'LEARY, *Primary Examiner.*